Patented Feb. 5, 1946

2,394,107

UNITED STATES PATENT OFFICE 2,394,107

GASTRO-INTESTINAL MAGNESIUM SILICATE MEDICAMENT

Reuben Roseman and Harry Eisenberg, Baltimore, Md., assignors, by mesne assignments, to Charles H. Burton, Baltimore, Md.

No Drawing. Original application March 21, 1940, Serial No. 325,122. Divided and this application October 28, 1942, Serial No. 463,718

3 Claims. (Cl. 167—55)

This application is a division of our copending parent application, Serial No. 325,122, filed March 21, 1940, which has issued as Patent No. 2,384,563, which latter application discloses a method for preparing a whole group of magnesium silicates, by the interaction of a magnesium salt and an alkali metal silicate, and more particularly a method for preparing a group of synthetic magnesium silicates having molecular ratios, $MgO:SiO_2$, ranging from approximately 1:3.1 to 1:4.3, especially those of approximate ratios 1:3.2 to 1:3.6, as well as the gastro-intestinal magnesium silicate medicament comprising a silicate aforesaid to which the present application is directed.

As the result of extensive clinical experience, preparations containing magnesium silicates comprehended by the above range have been found distinctly superior to other preparations employed for the treatment of peptic ulcers. The antidigestive, antacid, and adsorptive properties of these silicates further make them ideal constituents of weight-reducing agents (within limits, under proper medical control), dentifrices, etc., and also suited to a variety of other purposes which will be obvious to those skilled in the art.

We have found (among other things) that with increasing ratios of the amounts of reacting substances, moles $Na_2O,3.3SiO_2$/moles $MgSO_4.7H_2O$, the products show progressively increasing silica contents and correspondingly decreasing magnesia contents (water-free basis), with the attendant increasing ratios, moles $SiO_2$/moles $MgO$.

As an example of the antacid qualities of our synthetic materials, the following data (Table 1) are presented, showing the rate of reaction of the product of Experiment 17 [1], of our parent application, which is hereby made a part of this disclosure, with hydrochloric acid. The experiments were conducted at room temperature, with occasional shaking of the reaction flasks.

Table 1

| Sample, g.+N/14 HCl, cc. | Time, hrs. | N/14 NaOH, cc. (back titration) [2] | N/14 HCl neutralized, cc. |
|---|---|---|---|
| 0.500 | 50.0 | 0.25 | 27.1 | 22.9 |
| 0.500 | 50.0 | 0.50 | 24.0 | 26.0 |
| 0.500 | 50.0 | 1 | 21.5 | 28.5 |
| 0.500 | 50.0 | 2 | 15.2 | 34.8 |
| 0.500 | 50.0 | 3 | 12.4 | 37.6 |
| 0.500 | 50.0 | 36 | 6.2 | 43.8 |

[2] Indicator: Brom phenol blue.

The following is a specific example of a way of employing our invention or discovery.

Dissolve 22 lbs. 4 oz. $MgSO_4.7H_2O$ (U. S. P.) in 80 gallons tap water contained in a glass-lined tank.

To this magnesium sulfate solution is added, slowly, a previously prepared solution of 23,000 cc. sodium silicate solution (40° Baumé, brand "E," Philadelphia Quartz Co.) in 72,000 cc. tap water, with vigorous and thorough agitation of the mixture. Stirring of the precipitated magnesium silicate is continued for 15 to 30 minutes, or until a smooth, homogeneous suspension results.

The mix is now transferred to large canvas or duck filtering bags, suspended over suitable drains and having tap water inlets at the tops; and, after adhering liquor has drained off, the precipitate is washed, by suitable water additions with intimate mixing, draining, of course, proceeding all the while. The washing is continued until portions of the drippings show no tests (or only faint tests) for sulfate (with $BaCl_2$,HCl) and sodium (with zinc uranyl acetate). (The washing operation as outlined here is inordinately time-consuming, requiring several days, and on a large scale is most efficiently performed with the aid of a filter press.)

The washed material, freed as completely as possible from adhering liquid is spread in thin layers (one-eighth to one-half inch) in shallow, stainless steel or chromium-plated pans, and is allowed to dry in a warm room or oven, the drying temperature preferably not exceeding 65° C. A little experience enables one to tell when the drying operation is completed, the material then being uniformly very white and easily cracked. Yield of silicate: at least 22 lbs.

The dried silicate is pulverized until the material is impalpable; it is then sifted through a 100 (or more)-mesh sieve, whereupon it is ready to

[1] Analyses of Experiment 17.

| Percent $SiO_2$ | Percent MgO | Percent $H_2O$ | Percent $R_2O_3$ | Percent CaO | Percent $Na_2O$ | Percent $SO_3$ | Percent total |
|---|---|---|---|---|---|---|---|
| 65.81 | 12.83 | 20.42 | 0.37 | 0.26 | 0.06 | 0.04 | 99.79 |

| Percent $SiO_2$ $H_2O$-free basis | Percent MgO $H_2O$-free basis | Molecular ratio $MgO:SiO_2$ |
|---|---|---|
| 82.70 | 16.12 | 1:3.44 | be used, either alone, or in admixture with other materials, for antidigestant, antacid, adsorbent, or other purposes. Thus, a powder consisting of:

| | Parts |
|---|---|
| The synthetic silicate | 55.6 |
| Calcium carbonate | 40.3 |
| Sodium bicarbonate | 2.3 |
| Diammonium hydrogen phosphate (or magnesium ammonium phosphate) | 1.6 |

(Flavored with oil of peppermint and saccharin) has found great utility in the field of peptic ulcer therapy.

The invention or discovery as hereinabove set forth is embodied in particular form and manner but the invention or discovery may be variously embodied within the scope of the following claims.

We claim:

1. A gastro-intestinal medicament comprising a synthetic magnesium silicate having a molecular ratio, $MgO:SiO_2$, within the range of 1:3.2–1:4.3, and calcium carbonate.

2. A gastro-intestinal medicament comprising a synthetic magnesium silicate having a molecular ratio, $MgO:SiO_2$, within the range of 1:3.2–1:4.3, calcium carbonate, and at least one of the group of phosphates consisting of diammonium hydrogen phosphate and magnesium ammonium phosphate.

3. A therapeutic product suitable for use as a gastro-intestinal medicament, comprising a synthetic magnesium silicate having a molecular ratio of $MgO:SiO_2$, within the range of 1:3.2 to 1:3.6, substantially free of soluble salts formed in the preparation of such silicate, and containing combined water not removed by drying at a temperature not exceeding 65° C., and which is capable of neutralizing hydrochloric acid over a period of at least 3 hours, together with calcium carbonate, which is readily reactive with hydrochloric acid, and diammonium hydrogen phosphate.

REUBEN ROSEMAN.
HARRY EISENBERG.